United States Patent
Niell et al.

(10) Patent No.: US 7,257,665 B2
(45) Date of Patent: Aug. 14, 2007

(54) BRANCH-AWARE FIFO FOR INTERPROCESSOR DATA SHARING

(75) Inventors: Jose S. Niell, Franklin, MA (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 10/674,835

(22) Filed: Sep. 29, 2003

(65) Prior Publication Data

US 2005/0071602 A1 Mar. 31, 2005

(51) Int. Cl.
*G06F 13/00* (2006.01)

(52) U.S. Cl. ............................ 711/101; 710/57; 711/1; 711/5; 711/100; 711/111; 712/200; 712/233; 712/234; 712/236

(58) Field of Classification Search .................. 706/10, 706/15; 711/1, 2, 5, 6, 100, 101, 109, 111, 711/114, 117, 132, 133, 140, 144, 203, 204, 711/213–215; 710/1, 22, 24, 57; 712/200–203, 712/14, 233, 234–240
See application file for complete search history.

(56) References Cited

U.S. PATENT DOCUMENTS

| | | | | |
|---|---|---|---|---|
| 4,831,517 A | * | 5/1989 | Crouse et al. ................... 714/8 |
| 5,388,074 A | * | 2/1995 | Buckenmaier ......... 365/189.05 |
| 5,706,491 A | | 1/1998 | Mahan |
| 5,819,254 A | * | 10/1998 | Kawai ............................ 707/2 |
| 6,078,983 A | * | 6/2000 | Hanawa et al. ............. 710/240 |
| 6,269,436 B1 | * | 7/2001 | Tran et al. ..................... 712/23 |
| 6,532,531 B1 | * | 3/2003 | O'Connor et al. .......... 712/202 |
| 6,640,231 B1 | * | 10/2003 | Andersen et al. ........... 707/102 |
| 2001/0047439 A1 | * | 11/2001 | Daniel et al. ................. 710/52 |
| 2003/0070059 A1 | * | 4/2003 | Dally et al. ..................... 712/7 |

OTHER PUBLICATIONS

Hnatek, Eugene R., "A User's Handbook of Semiconductor Memories", 1977, A Wiley-Interscience Publication, John Wiley & Sons, Inc., pp. 163-181.
Taub, Herbert et al., "Digital Integrated Electronics", 1977, McGraw-Hill Book Company, pp. 394-396.
Mano, M. Morris, "Computer System Architecture, Second Edition", 1982, Prentice-Hall, Inc., pp. 426-428.
Horotitz, Paul et al., "The Art of Electronics, Second Edition", 1989, Cambridge University Press, p. 541.
"CMOS BiCMOS Data Book", Cypress Semiconductor Corporation, Feb. 1, 1989, pp. 5-34 through 5-57.
"Databook Data Converters—DSP Products", TRW LSI Products Inc., 1990, pp. 23-52.
Dorf, Richard C., "The Electrical Engineering Handbook", 1993, CRC Press, Inc., pp. 1725-1727.

* cited by examiner

*Primary Examiner*—David Vincent
*Assistant Examiner*—Omar F Fernández Rivas
(74) *Attorney, Agent, or Firm*—McDonald Hopkins, LLC

(57) ABSTRACT

A branch aware first-in first-out (FIFO) memory may include a memory array to store data; a push pointer to address memory locations therein to write data; a pop pointer to address memory locations therein to read data; a pointer memory; and control logic coupled to the pointer memory. The pointer memory saves prior pop pointer values of the pop pointer. The control logic may restore prior pop pointer values from the pointer memory into the pop pointer in response to receiving program branching information.

6 Claims, 6 Drawing Sheets

BRANCH-AWARE FIFO FOR INTERPROCESSOR DATA SHARING

BACKGROUND OF THE INVENTION

1. Field of the Invention

The invention relates generally to first in first out (FIFO) memory and registers, and more specifically to FIFO control in a multiprocessor system passing data with a shared FIFO.

2. Background Information

First-in first-out memory devices are well known. In some cases they may be formed out of a parallel array of registers or flip-flops coupled in series together or a register file with a read pointer (i.e., pop pointer) and a write pointer (i.e., push pointer). In another case, the FIFO memory device may be a may be a random access memory (RAM) array with a read pointer (i.e., pop pointer) and a write pointer (i.e., push pointer).

A FIFO memory may be used to buffer data between two digital devices operating at different speeds. FIFO memory devices are often used to buffer data such as in the case of a universal asynchronous receiver transmitter (UART) or a video frame buffer. In these cases, the data is written into the FIFO memory and retrieved from the FIFO memory in the same order. However, the data may be clocked into the FIFO memory at one rate and read out from the FIFO memory at another rate. In this case, the FIFO memory can be considered to be asynchronously clocked. If data is clocked into and out of the FIFO memory at the same rate, the FIFO memory can be considered to be synchronously clocked.

The storage devices generally used in FIFO memory are static type memory cells in order that the cells do not need refreshing and that they do not constantly need to be clocked. Examples of these types of memory cells are a latch or a flip-flop.

Basic control of FIFO memories devices is known, such as how to control the pushing of data (i.e., write) into a FIFO memory and how to pop data out (i.e., read) from a FIFO memory, as well as providing status information to indicate whether or not a FIFO memory is full or empty.

DETAILED DESCRIPTION

Figure 1:
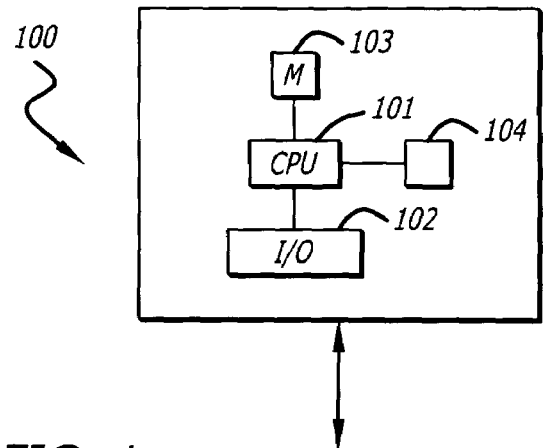
FIG. 1 illustrates a block diagram of a typical computer system in which the invention may be utilized.

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention.

A branch aware FIFO memory is disclosed that receives branching information from at least one of the processors to which it is coupled. The FIFO memory is made aware of the processor's branching information, including resolution latencies. Branch-aware FIFO memory allows a processor to issue pop requests to the FIFO memory before conditional branches are resolved. After the conditional branches are resolved, the branch-aware FIFO memory may restore a prior state of the POP pointer if the branch is taken.

Additionally, an algorithm is disclosed for computing a FIFO "High" status that takes into account the branch resolution latency. This algorithm allows speculative Pop's when the FIFO is "Empty", by ensuring that a "High" or Full status is not set in this case. In turn, this allows the FIFO to be used as a random access memory array without suppressing Pop's when the FIFO memory is "Empty" or a "Low" status is asserted.

In one embodiment, a branch aware first-in first-out (FIFO) memory is disclosed. The branch aware FIFO memory includes a memory array to store data; a push pointer to address memory locations in the FIFO memory in order to write data; a pop pointer to address memory locations in the FIFO memory in order to read data; a pointer memory; and control logic coupled to the pointer memory. The pointer memory saves one or more prior pop pointer values of the pop pointer. The control logic may restore one of the one or more prior pop pointer values from the pointer memory into the pop pointer in response to receiving branch information.

In another embodiment, the first-in first-out (FIFO) memory stores one or more prior pop pointer values of a pop pointer; processes one or more pop requests to read data from the FIFO memory; receives information to indicate that at least one of the one or more pop requests was speculative and that a state of the pop pointer of the FIFO memory should be restored; and it restores a prior pop pointer value into the pop pointer in response to the information. In yet another embodiment, the FIFO memory, before processing one or more pop requests, may store data into a memory array and increment a push pointer. Additionally in another embodiment, the FIFO memory may read a pop pointer value of a pop pointer and a push pointer value of a push pointer, and in response thereto, determine the status of the memory array. In yet another embodiment, the FIFO memory may bypass the pop pointer and the push pointer, and directly address the memory array in order to read and/or write data thereto.

Referring now to FIG. 1, a block diagram of a typical computer system 100 in which the invention may be utilized is illustrated. The computer system 100 includes a central processing unit (CPU) 101; input/output devices (I/O) 102 such as keyboard, modem, printer, external storage devices and the like; monitoring devices (M) 103, such as a CRT or graphics display; and a memory 104 for storing data/instructions. The monitoring devices (M) 103 provide computer information in a human intelligible format such as visual or audio formats. The system 100 may be a number of different systems including a computer system or a network processing system.

Figure 2A:
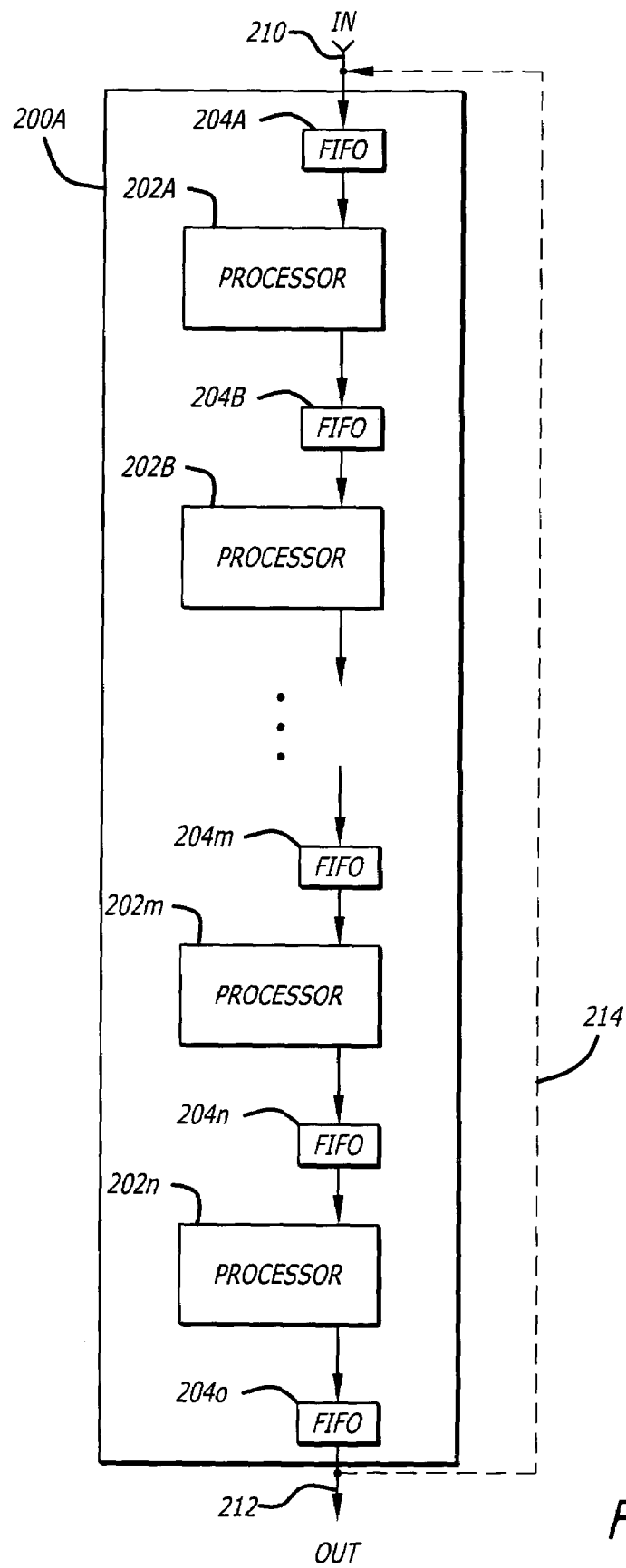
FIG. 2A illustrates a block diagram of an embodiment of a multiprocessor processing system in which the invention may be utilized.

Referring now to FIG. 2A, a block diagram of an embodiment of a multiprocessor processing system 200A is illustrated. The multiprocessor processing system 200A may be a single integrated circuit, such as a multiprocessor processor (MPP) integrated circuit. The multiprocessor processing system 200A includes a plurality of processors 202A-202n, and a plurality of branch-aware FIFO memories 204A-204n. The multiprocessor processing system 200A may further include another FIFO memory 204o coupled between the output 212 and the processor 202n. The FIFO memory 204o need not be a branch-aware FIFO memory.

The branch-aware FIFO memories 204B-204n are coupled between processors 202A-202n in order to pass data from one processor to the next unidirectionally. For example, processor 202A passes data to processor 202B through branch-aware FIFO memory 204B. The branch-aware FIFO memories can also buffer the data being passed between processors, such as when one processor takes longer to execute an instruction than another, for example. The branch-aware FIFO memory 204A may not be coupled between processors, particularly when receiving new data inputs from the data input IN 210 coupled thereto.

Optionally, the plurality of processors 202A-202n, and the plurality of branch-aware FIFO memories 204A-204n, and FIFO memory 204o may be coupled into a ring configuration by optional bus 214 coupled between the data input IN 210 and the data output OUT 212. In which case, the FIFO memories 204o and 204A couple between the processor 202n and 202A.

Figure 2B:
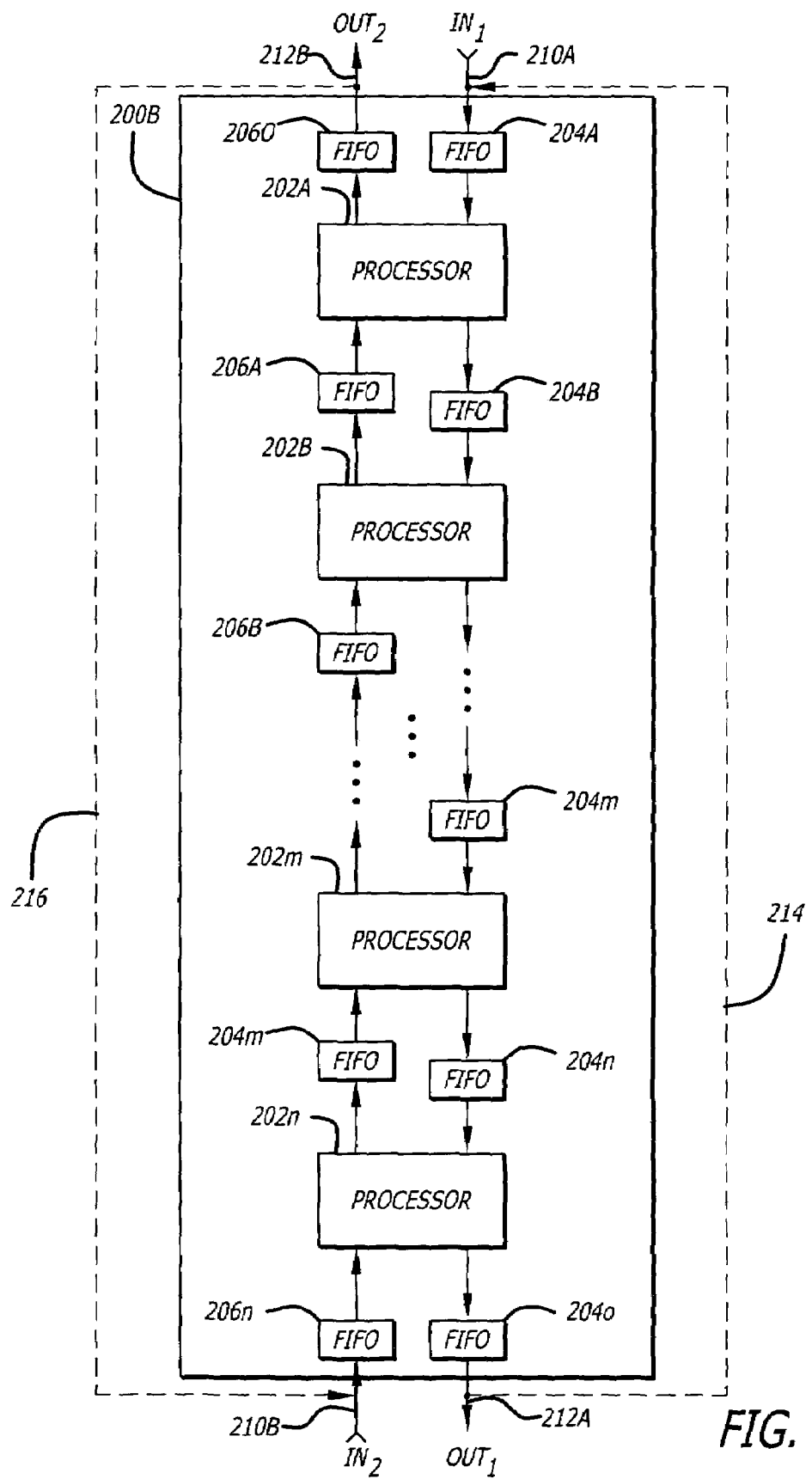
FIG. 2B illustrates a block diagram of another embodiment of a multiprocessor processing system in which the invention may be utilized.

Referring now to FIG. 2B, a block diagram of a multiprocessor processing system 200B is illustrated. The multiprocessor processing system 200B may be a single integrated circuit, such as a multiprocessor processor (MPP) integrated circuit. The multiprocessor processing system 200B includes a plurality of processors 202A-202n, a first plurality of branch-aware FIFO memories 204A-204n, and a second plurality of branch-aware FIFO memories 206A-206n. The multiprocessor processing system 200B may further include a FIFO memory 204o coupled between the output 212A and the processor 202n and a FIFO memory 206o coupled between the output 212B and the processor 202A. The FIFO memories 204o and 206o need not be branch-aware FIFO memories.

The branch-aware FIFO memories 204B-204n and 206A-206m are coupled between processors 202A-202n in order to pass data from one processor to the next bidirectionally. For example, processor 202A passes data to processor 202B through branch-aware FIFO memory 204B and processor 202B passes data to processor 202A through branch-aware FIFO memory 206A. The branch-aware FIFO memories can also buffer the data being passed between processors, such as when one processor takes longer to execute an instruction than another, for example. The branch-aware FIFO memories 204A and 206n may not be coupled between processors, particularly when receiving new data inputs from the data inputs IN1 210A and IN2 210B coupled respectively thereto.

Optionally, the plurality of processors 202A-202n, and the plurality of branch-aware FIFO memories 204A-204n, and FIFO memory 204o may be coupled into a ring configuration by optional bus 214 coupled between the data input IN1 210A and the data output OUT1 212A. In which case, the FIFO memories 204o and 204A couple between the processor 202n and 202A. Optionally, the plurality of processors 202A-202n, and the plurality of branch-aware FIFO memories 206A-206n, and FIFO memory 206o may be coupled into a ring configuration by optional bus 216 coupled between the data input IN2 210B and the data output OUT2 212B. In which case, the FIFO memories 206o and 206n couple between the processor 202n and 202A.

Figure 3A:
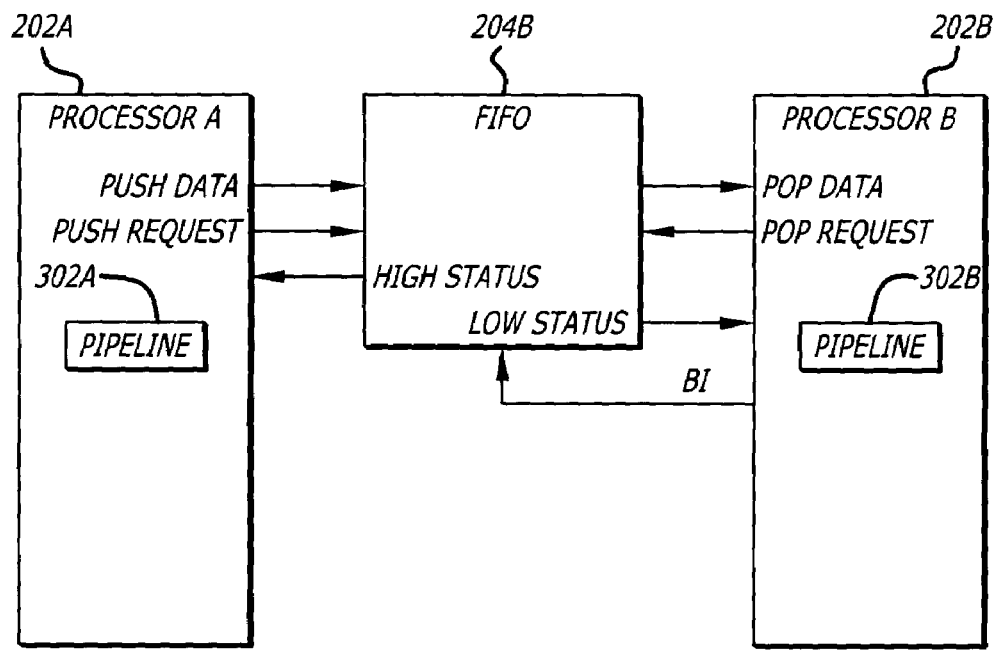
FIG. 3A illustrates a block diagram of a portion of FIG. 2A illustrating a branch-aware FIFO memory coupled between processors in the multiprocessor system to pass data in one direction.

Referring now to FIG. 3A, a block diagram of a portion of FIG. 2A illustrating the branch-aware FIFO memory 204B coupled between processors 202A and 202B in the multiprocessor system 200A is illustrated. Through the branch-aware FIFO memory 204B, data can be buffered and passed in one direction from processor A 202A to processor B 202B.

The branch-aware FIFO memory 204B maintains a high status which is coupled into processor A 202A and a low status which is coupled into processor B 202B. Pop data from the FIFO memory 204B is coupled into processor B 202B in response to receiving pop requests there-from.

Push data and push requests are coupled into the FIFO memory 204B from processor A 202A for writing data into the FIFO memory 204B. Pop requests are coupled into the FIFO memory 204B from processor B 202B for reading data from the FIFO memory 204B. Branch information BI from the processor B 202B is coupled into FIFO memory 204B to be aware of a branch condition that processor B 202B may incur.

Each of the processors 202A-202n is pipelined and can execute instructions speculatively before resolving conditional branches. Each of the processors 202A-202n has an instruction pipeline, such as pipelines 302A and 302B of processor A 202A and processor B 202B, respectively. Either processor may execute a conditional instruction that requires branching off to another software routine or different instruction out of the ordinary sequence of instructions within the instruction pipeline. The branch condition and other information relating to the branch condition are coupled into the branch-aware FIFO memories as the branch information BI. In one embodiment, the branch information BI includes a flag to indicate a branch was taken; the number of instructions that were speculatively executed due to the branch resolution latency; and whether or not there was a delayed branch and if so, by how many cycles.

The branch aware FIFO memory 204B is made aware of the processor B's 202B branching information, including branch resolution latencies. The branch-aware FIFO memory 204B allows processor B 202B to issue pop requests to the FIFO memory 204B before branches are resolved. After the branches are resolved, the branch-aware FIFO memory 204B restores the correct state of the POP pointer. Additionally, an algorithm by the control logic therein is used to compute a FIFO "High" status that takes into account the maximum branch resolution latency. This algorithm allows speculative Pop's when the FIFO is "Empty", by ensuring that a "High" or Full status is not set in this case. In turn, this allows the FIFO memory to be used as a random access memory array without suppressing Pop's when the "Low" status is asserted.

Figure 3B:
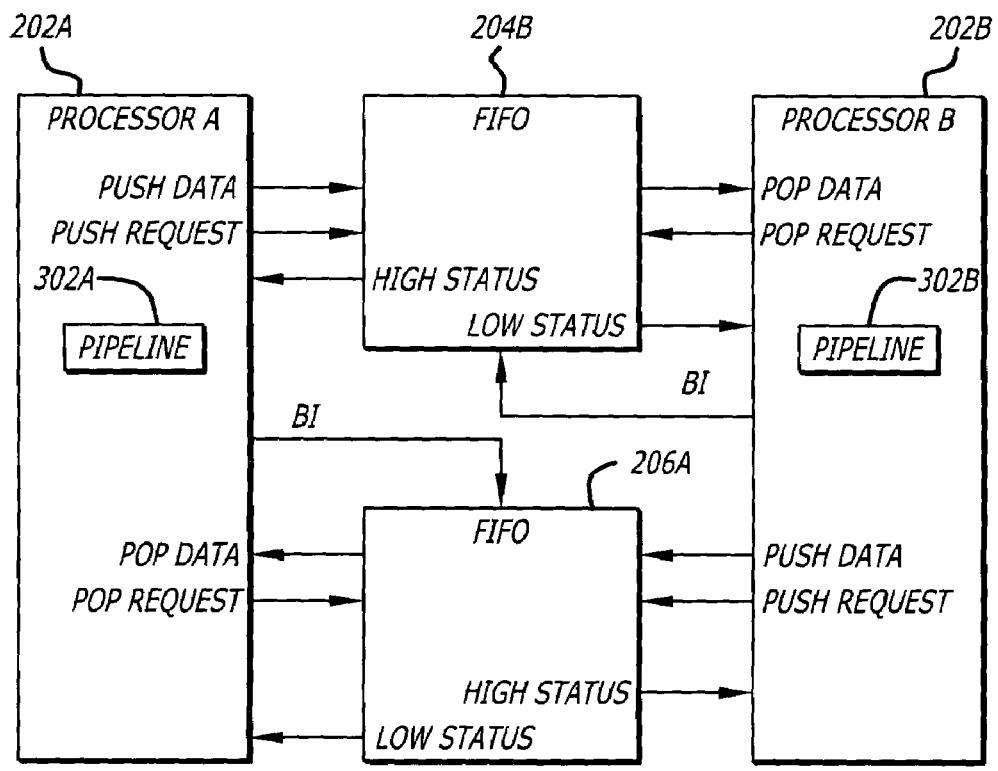
FIG. 3B illustrates a block diagram of a portion of FIG. 2B illustrating a pair of branch-aware FIFO memories coupled between processors in the multiprocessor system to pass data in two directions.

Referring now to FIG. 3B, a block diagram of a portion of FIG. 2B is illustrated. In FIG. 3B, a pair of branch-aware FIFO memories 204B and 206A are coupled between processors 202A and 202B. The pair of branch-aware FIFO memories 204B and 206A allow data to be buffered and passed bidirectionally between the processors 202A and 202B. Through the branch-aware FIFO memory 204B, data is buffered and passed from processor A 202A to processor B 202B. Through the branch-aware FIFO memory 206A, data is buffered and passed from processor B 202B to processor A 202A.

The branch-aware FIFO memory 204B maintains a high status, which is coupled into processor A 202A, and a low status, which is coupled into processor B 202B. The branch-aware FIFO memory 206A maintains a high status, which is coupled into processor B 202B, and a low status, which is coupled into processor A 202A.

Pop data from the FIFO memory 204B is coupled into processor B 202B in response to receiving pop requests there-from. Pop data from the FIFO memory 206A is coupled into processor A 202A in response to receiving pop requests there-from. Pop requests are coupled into the FIFO memory 204B from processor B 202B for reading data from the FIFO memory 204B. Pop requests are coupled into the FIFO memory 206A from processor A 202A for reading data from the FIFO memory 206A.

Push data and push requests are coupled into the FIFO memory 204B from processor A 202A for writing data into the FIFO memory 204B. Push data and push requests are coupled into the FIFO memory 206A from processor B 202B for writing data into the FIFO memory 206A.

Branch information BI from the processor B 202B is coupled into FIFO memory 204B to be aware of a branch condition that processor B 202B may incur. Branch information BI from the processor B 202A is coupled into FIFO memory 206A to be aware of a branch condition that processor B 202A may incur.

While FIG. 3B illustrates branch-aware FIFO memories 204B and 206A being separate and apart, they may be combined into a single bi-directional FIFO memory in an alternate embodiment. While FIG. 3A illustrates the branch-aware FIFO memory being separate and apart, in an alternate embodiment the branch-aware memory 204B may be an integral part of each processor. In yet another alternate embodiment, the branch-aware memories 204B and 206A may be an integral part of each processor.

Figure 4A:
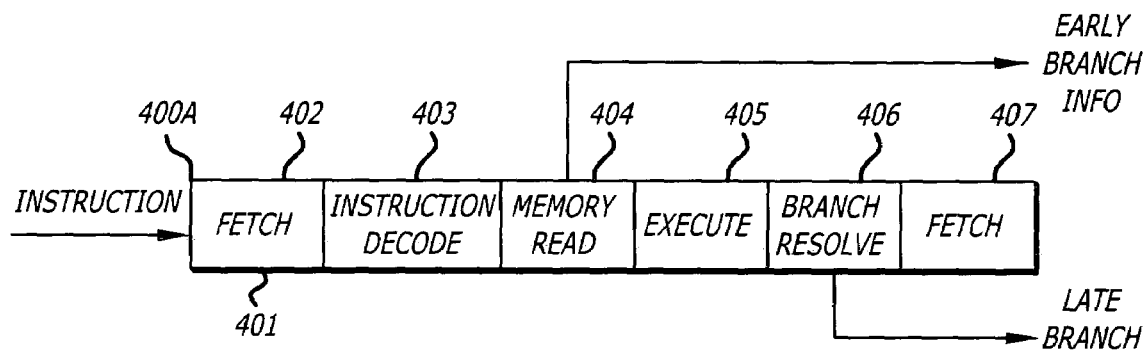
FIG. 4A illustrates a block diagram of an embodiment of an instruction pipeline.

Referring now to FIG. 4A, a block diagram of an embodiment of an instruction pipeline 400A is illustrated. The instruction pipeline 400A is an exemplary embodiment of the instructions pipelines 302A-302B. The instruction pipeline 400A receives instructions or microinstructions at one end and processes them through six stages or cycles 401. The six stages or cycles 401 include a fetch cycle 402, an instruction decode cycle 403, a memory read cycle 404, an execution cycle 405 a branch resolve cycle 406, and another fetch cycle 407.

During the branch cycle 406, the branch information BI is supplied to the branch aware FIFO memory is late. Prior to resolving a branch instruction, the branch-aware FIFO memory may be responding to POP requests from a processor due to speculative execution. For example, prior to resolving the late branch instruction at cycle 406, there may be other instructions in the processor pipeline that issue a Pop request during the instruction decode cycle 403, such that the FIFO Pop occurs at the Memory Read cycle 404. If the branch instruction is resolved at 406 such that the instructions in the pipeline should be aborted, then the status of the FIFO pop pointers should be restored. The branch information BI supplied to the branch aware FIFO memory allows it to restore itself to the state that is consistent with the resolution of the branch instruction, effectively ignoring the Pops that were speculatively executed.

The branch information BI may be supplied earlier to the branch aware FIFO memory than at cycle 406. For example, the branch information BI may be supplied to the branch aware FIFO memory at the memory read cycle 404 and a fetch may occur at cycle 405 in the instruction pipeline before cycle 406.

The branch resolution latency is included in the branch information BI and is expressed as a number of instruction cycles. The branch resolution latency can vary between a maximum value and a minimum value. The maximum value of branch resolution latency (referred to as maximum branch resolution latency) is the depth of the instruction pipeline. Generally, the value of the branch resolution latency is the number of instruction cycles to resolve a branch condition. That is, the maximum value of branch resolution latency may be reduced if a conditional branch can be resolved earlier so that the processor can commit to an instruction sequence.

The maximum branch resolution latency of the instruction pipeline 400A is four as indicated at the branch resolve cycle 406 in FIG. 4A. This is the case if the condition that is being tested for the branch cannot be computed prior to the branch resolve cycle 406. In this case, up to three pop requests from the branch-aware FIFO memory can be processed speculatively.

The minimum value of the branch resolution latency (referred to as the minimum branch resolution latency) of the instruction pipeline 400A occurs when the condition being tested is already available. For example, the instruction pipeline 400A illustrates branch information available at the Memory Read cycle 404 because the condition being tested is already available. In this case the minimum branch resolution latency is two and only one pop request from the branch-aware FIFO memory may be processed speculatively.

A delayed branch instruction is one that allows one or more instructions issued after the branch to fully execute to completion, regardless of the branch resolution outcome.

If the branch instruction does not have a delayed branch (i.e., it is not a delayed branch instruction) and it is resolved to be taken, the Pop pointer may need to be restored to a state prior to the processing of any speculative pop requests. However, if the branch instruction has a delayed branch, some of the speculative pop requests may not be ignored and the pop pointer may need to be restored to a different state after some of the speculative pop requests were executed. For example assuming that four speculative pop requests were processed and the delayed branch was equal to one cycle, then all but the first speculative pop requests would be ignored and the pop pointer would be restored to a state after the processing of the first speculative pop requests. If the delayed branch was equal to two cycles, then all but the first two speculative pop requests would be ignored and the pop pointer would be restored to a state after the processing of the first two speculative pop requests. However if the delayed branch were equal to zero cycles, no delayed branch, than all speculative pop requests would be ignored and the pop pointer would need to be restored to a state prior to the processing of any such speculative pop requests.

Figure 4B:
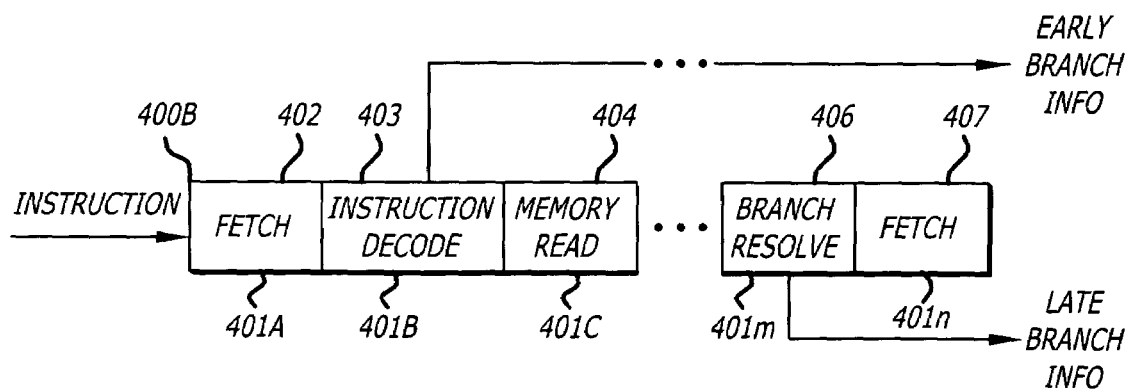
FIG. 4B illustrates a block diagram of another embodiment of an instruction pipeline.

Referring now to FIG. 4B, a block diagram of another embodiment of an instruction pipeline 400B is illustrated. The instruction pipeline 400B includes "N" stages or cycles 401A-401n. The instruction pipeline 400B is another exemplary embodiment of the instructions pipelines 302A-302B. The N stages or cycles 401A-401n may include a fetch cycle 402, an instruction decode cycle 403, a memory read cycle 404, an execution cycle 405, a branch resolve cycle 406, and another fetch cycle 407. During the branch cycle 406, or just before, the branch information BI is supplied to the branch aware FIFO memory so that it can restore itself to the prior state if a branch condition occurs.

The maximum branch resolution latency of the instruction pipeline 400B is the number of stages between the fetch cycle 402 at stage 401A and the fetch cycle 407 at stage 401n. In which case, the branch resolution latency would be equal to two subtracted from n or n−2. In any case if the branch instruction is resolved to be taken, the Pop pointer may need to be restored to a prior saved state after encountering the branch instruction subject to any delayed branch.

The minimum branch resolution latency is where the condition to be tested is already available. For example, in FIG. 4B the branch information is provided early at the instruction decode cycle 401B, since the condition to be tested in the conditional branch instruction is already available. In this case, the minimum branch resolution latency of the instruction pipeline 400b is one at cycle 403.

Figure 5A:
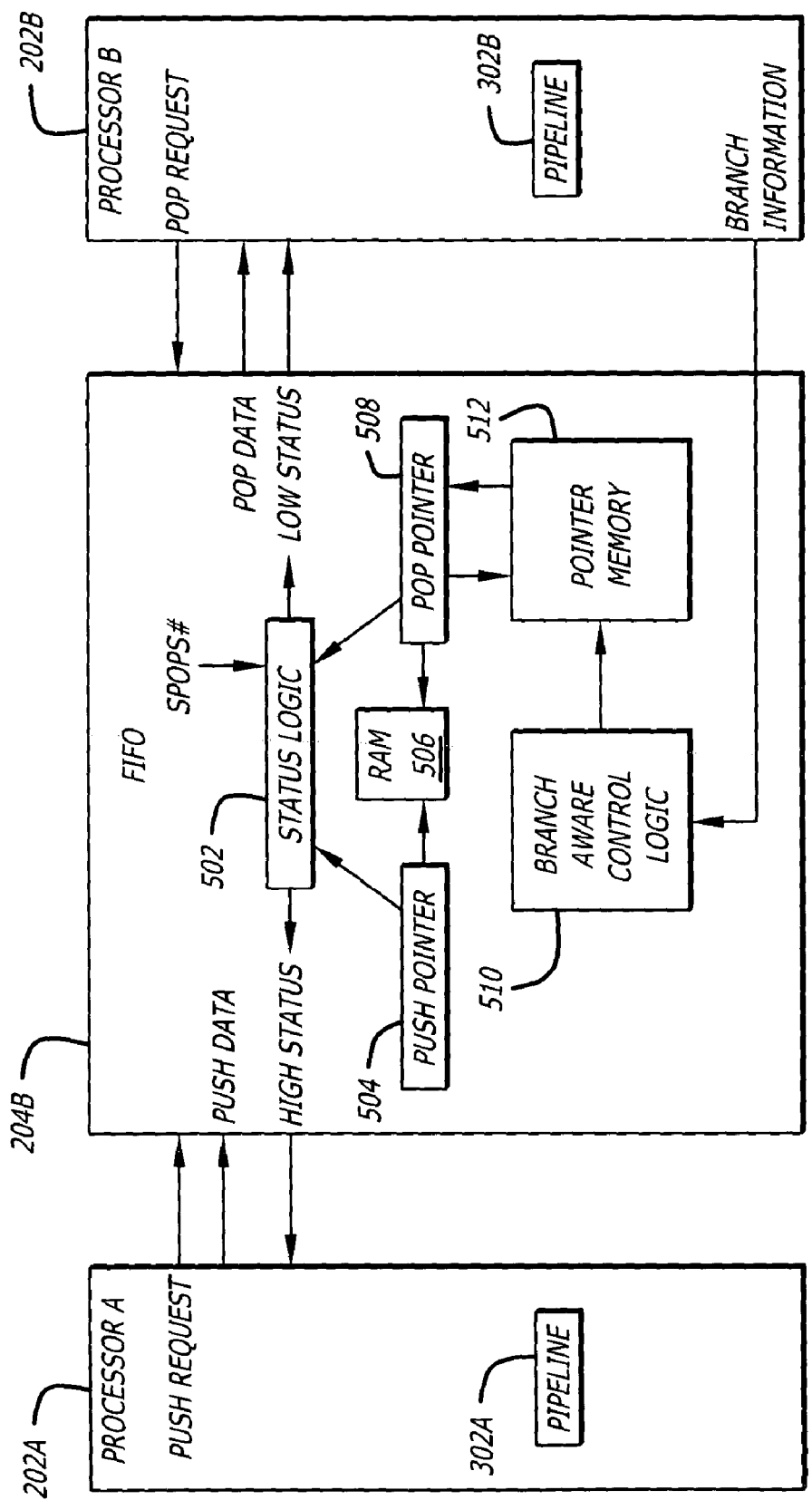
FIG. 5A illustrates a block diagram of the branch-aware FIFO memory in greater detail coupled between processors in the multiprocessor system of FIG. 2A to pass data in one direction.

Referring now to FIG. 5A, a block diagram of the branch-aware FIFO memory 204B is illustrated in greater detail. The branch-aware FIFO memory 204B is coupled between processors 202A and 202B to pass data in one direction. It is to be understood that the branch-aware FIFO memory 206A is merely a mirror image of the branch-aware FIFO memory 204B to pass data in an opposite direction so that bi-directional data passing may occur between processors 202A and 202B as is illustrated in FIG. 3B.

To maximize performance, features are added to a FIFO memory 204B so that it can be "aware" of the instruction pipeline and branching logic of Processor B 202B. The branch-aware FIFO memory 204B includes status logic 502, a push (i.e., write) pointer 504, a memory array or register set 506, a pop (i.e., read) pointer 508, branch-aware control logic 510, and pointer memory 512 coupled together as shown and illustrated in FIG. 5A.

The push pointer 504 is an address pointer into the memory array or register set 506 for writing data. The pop pointer 508 is an address pointer into the memory array or register set 506 for reading data. In one embodiment, each of the push pointer and pop pointer can be incremented while in another embodiment each may be decremented in response to push or pop requests, respectively. That is, the pointers function as counters to increment or decrement the address to which they point into the memory array 506. In one embodiment, the push and pop pointers are incremented whenever a push or pop occurs, respectively. In another embodiment, the push and pop pointers are decremented whenever a push or pop occurs, respectively. In either case, by using push and pop requests the processors need not keep track of an address for where data is stored in the FIFO memory.

The memory array 506 may be an array of memory cells forming a random access memory; an array of latches forming a register file; or an addressable array of flip-flops. The memory cells may be static, dynamic, nonvolatile types of memory cells, or other types of memory cells.

The status logic 502 couples to the pop pointer 508 and the push pointer 504 in order to generate a high status flag (i.e., full) or a low status flag (i.e., empty) for the memory array 506. The high status differs from a high threshold in that the available number of expected speculative pops is taken into consideration.

The pointer memory 512 has memory elements to store old or prior versions (i.e., values) of the pop pointer. The memory elements may be an array of memory cells, an array of latches, or an array of flip-flops. The memory cells may be static, dynamic, nonvolatile, or other types of memory cells. The pointer memory 512 saves prior states or values of the pop pointer 508. A history of prior pop pointer values for the pop pointer 508 is stored into the pointer memory 512. The history of pop pointer values may be stored in the pointer memory 512 by various ways. In one embodiment a free running history of prior pop pointer values is saved every clock cycle. In another embodiment, the prior pop pointer value is saved when the pop pointer changes state (i.e., its incremented or decremented). In this case, power may be conserved over that of the free running method of saving prior pop pointer values.

A maximum number of pop pointer values stored depends upon the maximum branch resolution latency of the processor B 202B. For example, if the worst case branch instruction is resolved in three cycles then three prior pop pointer values may be stored into the pointer memory.

The prior states or values of the pop pointer 508 can be read out and restored into the pop pointer 508 under control of the branch-aware control logic 510. This allows the pop pointer 508 to be restored if the branch in a branch instruction is taken and speculative pop requests were issued to read or pop data out of the FIFO memory.

The branch-aware control logic 510 may be separate control logic or logic included as part of overall control logic of the FIFO memory. In any case, the branch-aware control logic 510 receives branch information from processor B 202B so that it is aware of the instruction pipeline and the branching logic of Processor B 202B. The branch information includes the branch resolution latency of processor B 202B for the given branch instruction and whether or not a delayed branch was taken. If the condition in a branch instruction is resolved and the branch is taken, as indicated by branch information, the branch-aware control logic 510 causes a prior value of the pop pointer saved in pointer memory 512 to be restored into the pop pointer 508.

A conditional branch instruction is one that may branch to another instruction or subroutine based on a certain condition. The condition may be specified and/or computed in the instruction itself; computed by an earlier instruction; or the instruction may point to another instruction for a test condition. In contrast, an unconditional branch instruction is one that points to another instruction without any conditional testing or committing to a new thread. As discussed previously, each processor 202A-202n can speculatively execute instructions prior to resolving any branch instruction. Additionally, each processor 202A-202n can speculatively execute another thread of multiple threads of instructions prior to committing to a new thread in a branch instruction. A thread is a sequence of instructions to be executed in another context or state of the processor. Multiple threads may be simultaneously executed in the same processor.

Processor B 202B can issue a certain number of speculative POP's, referred to as SPOPS. The number of SPOPS that can be executed is the lesser of the maximum branch resolution latency or the level of the FIFO low threshold. That is, the SPOPS#=minimum (maximum branch resolution latency, FIFO low threshold).

Consider for example, Processor B 202B has a Low threshold set to five to indicate a low status and a pseudo-microcode as illustrated in TABLE I below.

TABLE I

If (FIFO_LOW) then {Wait}
else { Pop
　　Pop
　　Pop

TABLE I-continued

> Pop
> Pop }

The branch instruction in the microcode sequence of TABLE I is the "If (FIFO_LOW) then {Wait}" instruction. The processor B 202B can speculatively execute "POP" instructions that follow the branch instruction by issuing pop requests to the branch-aware FIFO 204B. However, the number of "POP" instructions that can be speculatively executed is limited by the SPOPS# equation above. If the maximum branch resolution latency is four for the processor B 202B, depending upon the type of instruction pipeline, then Processor B can issue up to four speculative POP requests to the branch aware FIFO. That is, the SPOPS# is the lesser of four or five; or SPOPS#=[minimum (4, 5)].

As the branch instruction moves along the pipeline and it is resolved to be true (i.e., low status of the FIFO is indicated being below the low threshold), then Processor B 202B sends the branch information (BI) to the branch-aware FIFO memory 204B and the Branch is taken such that processor B waits before executing any further pop instructions. The branch information (BI) sent to the branch-aware FIFO memory 204B includes the Branch Resolution latency number of four.

As discussed previously, the pointer memory 512 stores prior states of the pop pointer 508. Upon receiving the branch information and a branch flag indicating that the branch was taken, the branch aware control logic 510 causes the appropriate location in the pointer memory 212 to be read out and loaded into the pop pointer 508. In this manner, the branch aware FIFO memory 204B restores the state of the POP pointer 508 to its value that it held four cycles prior. This effectively cancels out the speculative POP requests that were made by processor B 202B.

If the branch is resolved to be false (i.e., low status of the FIFO is not below the threshold), then further instructions can be executed by the processor B 202B, data from the speculative pop requests can be utilized, and the state of the branch aware FIFO memory 204B need not be restored.

A more complicated branch instruction may require more conditions and complicate the computation of the branch resolution latency. Since different branches can have different latencies, the Branch Resolution latency can be dynamic and computed by Processor B 202B in real time.

Consider for example, a pseudo-microcode for Processor B 202B as illustrated in TABLE II below.

TABLE II

> If (FIFO_LOW OR A<=B) then {Wait}
> else {Pop
> Pop
> Pop
> Pop
> Pop }

The condition of either the FIFO having a low status or the condition of A being less than or equal to B includes a subtract instruction and two branches. A careful programmer or optimized assembler/compiler can minimize the branch resolution latencies by carefully ordering these instructions. The result could be that the branch resolution latency for this case may be less than the maximum branch resolution latency of processor B, thereby minimizing the number of speculative pops that may have occurred. The value determined for the branch resolution latency of processor B is passed to the FIFO memory when a branch is taken.

Note that the speculative POP's requested by processor B can also have an affect on the setting of the High Threshold and the computation of the high status. That is, the speculative POP's requested by processor B may reduce the amount of data stored into the memory 506 such that additional elements can be added. The High threshold for a typical FIFO is often set according to the following equation:

High threshold=FIFO_SIZE−$K$×(Push Quantum+Propagation Delay to FIFO+Delay of Generation Full Status+Propagation Delay from FIFO)

This equation subtracts an estimated number of pushes that may be in flight from the size of the number of data elements that may be stored in the memory array. In the equation, the FIFO_SIZE is the maximum number of bytes, words, or data elements, depending upon how data is written into the FIFO that may be stored into the FIFO memory. K is a constant to convert the number of cycles of delay into a pushed data element. In one embodiment assuming that a push can occur every cycle, K equals one data element per cycle, such as may be assumed to be worst case in a fully saturated system. That is, for every cycle of delay, there may be a push of a data element in flight into the FIFO memory.

Subtracted from the FIFO_SIZE are cycle delays converted into the number of bytes, words, or data elements to provide a margin in the generation of the Full Status flag. Push Quantum is the number of push cycles to push bytes, words, long-words, or data elements that may be performed without rechecking the High Status flag. Propagation Delay to FIFO is the cycle delay time or latency (in a number of cycles) of sending the push request from processor A to the FIFO. Delay of Generation Full Status is the cycle delay time or latency in updating the push pointer and generating the new Full Status Flag. Propagation Delay from FIFO is the cycle delay time or latency of sending the FIFO Full Status flag from the FIFO to processor A.

Since the speculative POP's add some uncertainty to the generation of the High Status, a High threshold' for the branch-aware FIFO memory is computed according to the following equation:

High threshold'=FIFO_SIZE−$K$×(Push Quantum+Propagation Delay to FIFO+Delay of Generation High Status+Propagation Delay from FIFO)−SPOPS#

In this case for High threshold', the SPOPS# is further subtracted from the FIFO_SIZE to provide certainty to the value of the High Status Flag by ensuring processor B has committed to the speculative Pop's it had issued. Note that Full Status is also referred to herein as High Status. As discussed previously, the SPOPS# in units of data elements is computed according to the following equation:

SPOPS#=minimum (maximum branch resolution latency, FIFO low threshold)

Note that SPOPS# may be a constant as both the maximum branch resolution latency and the FIFO low threshold may be set to constant values.

To ensure correct operation of the branch-aware FIFO memory, the HIGH status flag can be updated as follows to avoid having a false HIGH status when speculative POP's occur on an EMPTY FIFO.

FIFO has a High Status flag if (number of entries in FIFO > HIGH threshold')

AND (number of entries in FIFO <=(FIFO_SIZE-SPOPS#)) where

SPOPS#=minimum (branch resolution latency, FIFO low threshold).

Herein we can define the equation FIFO_SIZE-SPOPS# as being the maximum utilization of the FIFO memory.

That is, the FIFO has a high status if the number of entries in the FIFO exceeds the high threshold' and the number of entries in the FIFO is less than or equal to the value of the SPOPS# subtracted from the FIFO_SIZE. If either of these conditions are not true, a High status flag is not generated. A High status flag is not generated if the SPOPS#, which indicates an expected number of speculative pops, is sufficiently large enough to provide some margin before all FIFO memory locations are used. Alternatively, a High status flag is not generated if the number of used FIFO memory data elements is less than the high threshold' setting.

The status logic 502 may also generate a low status flag in response to an amount of data stored in the memory array being less than or equal to a low threshold level and greater than or equal to an empty threshold level. The low threshold level may be set to a desired Pop Quantum, where a Pop Quantum is the number of pop cycles to pop bytes, words, long-words, or data elements that may be performed without rechecking the Low Status flag. The empty threshold level may be set to zero words, zero bytes or zero data elements available for reading data from the memory array.

Figure 5B:
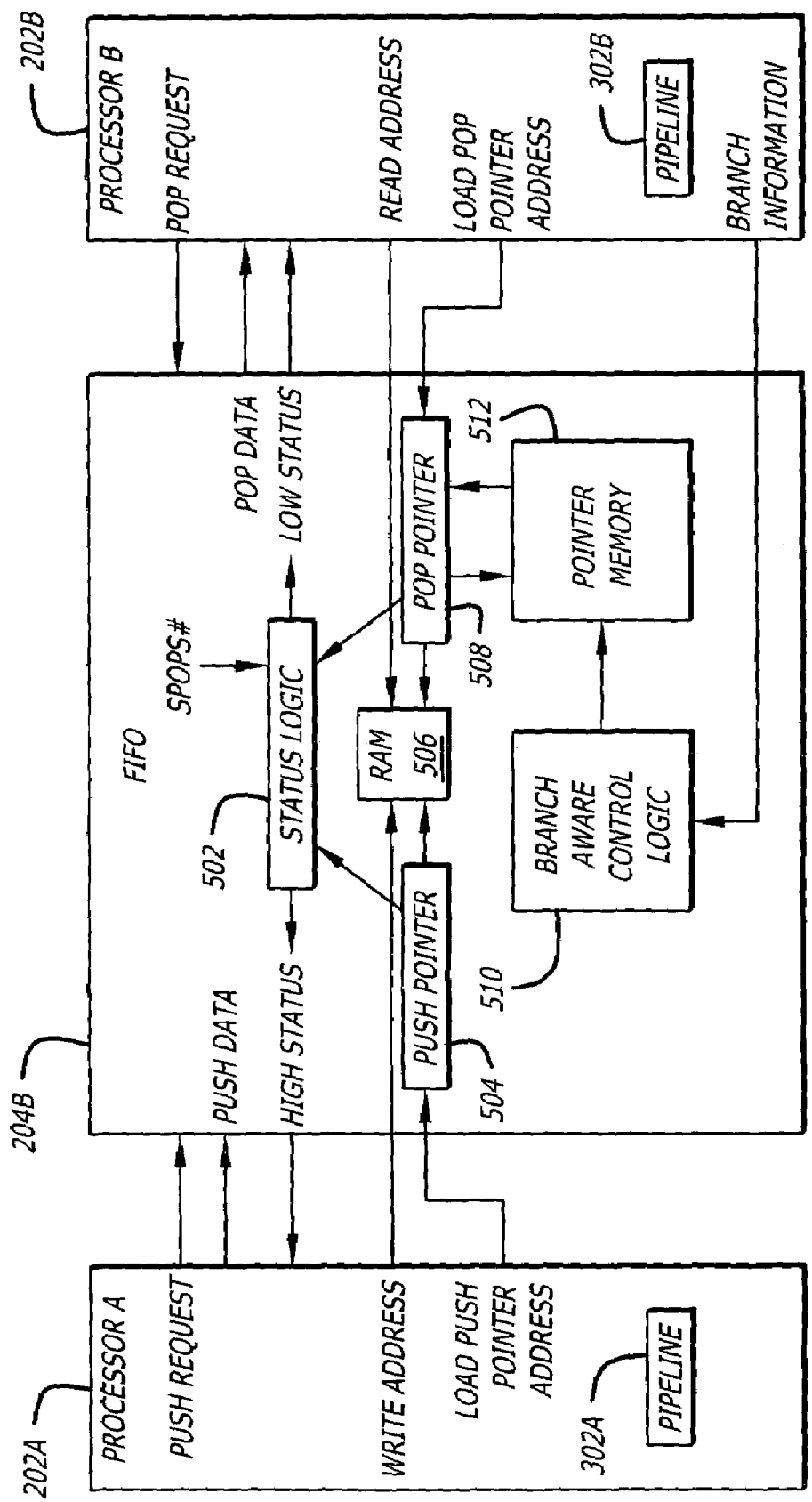
FIG. 5B illustrates a block diagram of the branch-aware FIFO memory in greater detail coupled between processors in the multiprocessor system of FIG. 2A to provide direct access to the memory array of the FIFO memory.

Referring now to FIG. 5B, a block diagram of the branch-aware FIFO memory 204B illustrates how processor B 202B is provided direct access to the memory array 506 of the FIFO memory 204B. While the branch-aware FIFO memory 204B may be used to buffer data in a First-in First-out basis, the memory array 506 may also be randomly accessed by processor 202B to directly read data out.

Processor B 202B, besides making a pop request, can directly access the data in the memory array 506 by loading the pop pointer 508 with an address and issuing a pop request. Alternatively, Processor B 202B can directly access the data in the memory array 506 by directly issuing a read address into the memory array 506 as is illustrated in FIG. 5B.

In another embodiment, Processor A 202A may directly access data in the memory array 506 by loading the push pointer 504 with an address and issuing a push request. Alternatively, Processor A 202A can directly access the data in the memory array 506 by directly issuing a write address into the memory array 506 as is illustrated in FIG. 5B.

In a typical system with FIFO memory, the Full (or High) status and empty (or Low) status may be checked before writing or reading data respectively with the FIFO memory. That is, a processor may check if the empty flag (or Low status) indicates that the FIFO memory has data available to access before issuing a pop request to read data. In this case if it did indicate empty (or Low), the processor would wait until the flag changed before issuing a pop request in order to read data when it did not indicate the FIFO memory was empty (or low). Similarly, a processor may check if a full flag (or High status) indicates that the FIFO memory is full before issuing a push request to write data into the FIFO. In case it did indicate a full (or high status), the processor would wait until the flag changed before issuing a push request in order to write data when it did not indicate the FIFO memory was full.

With direct access into the memory array 506 of the FIFO 204B, the processor 202B can read a memory location over and over again, or increment through memory addresses on its own, in a burst mode by supplying a new address every cycle without having to issue pop requests for every word of pop data.

With direct access into the memory array 506 of the FIFO 204B, the processor 202A can write to a memory location over and over again, or increment through memory addresses on its own, in a burst mode for example by supplying a new address every cycle without having to issue push requests for every word of push data.

Furthermore, the low and high status indicators may be ignored with direct access into the memory array 506 of the FIFO 204B. That is, to allow the FIFO to be randomly accessed like a random access memory there is no suppression of POP's or PUSH's when a Low status or High status is indicated. The way in which the HIGH status is computed for the FIFO memory by including the SPOPS# makes this feasible. The processor 202B need not check the low status before it randomly accesses the memory array 506.

Without a branch aware FIFO, the processor waits for a branch instruction to be resolved before issuing any pop requests to the FIFO memory to read data. The invention provides for high performance data transfer between processors in single chip multiprocessor systems.

The invention allows the FIFO memory to respond to POP requests early enough in the processor instruction pipeline so that the POP data can be used as Operand data. Otherwise, the POP data would need to be acquired via a memory transfer operation, which would require at least one more additional instruction to access the Operand data. The cycle performance of the FIFO memory is improved by speculatively acquiring the data via a memory transfer and in one embodiment, the improved cycle performance is equal to one added to the number of cycles of Branch Resolution Latency.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, it may be possible to implement the invention or some of its features in hardware, firmware, software or a combination thereof where the software is provided in a processor readable storage medium such as magnetic, optical, or semiconductor storage.

What is claimed is:

1. A method, comprising:
   storing one or more prior pop pointer values of a pop pointer;
   prior to processing one or more pop requests,
      storing data into a memory array of a FIFO memory, and
      incrementing a push pointer;
   processing one or more pop requests to read data from the FIFO memory;
   reading a pop pointer value of the pop pointer and a push pointer value of the push pointer;
   determining a status of the memory array in response to the pop pointer value, the push pointer value, a high threshold level, and a low threshold level, where the high threshold level is responsive to the lesser of a maximum branch resolution latency and the low threshold level;

receiving information to indicate at least one of the one or more pop requests was speculative and to indicate that a state of the pop pointer of the FIFO memory should be restored; and restoring one of the one or more prior pop pointer values to the pop pointer in response to the information.

2. The method of claim 1, where, the maximum branch resolution latency is a depth of an instruction pipeline in a processor, the processor to couple to the FIFO memory.

3. The method of claim 1, where, the information includes a branch resolution latency, the branch latency being the number of instruction cycles to resolve a conditional branch instruction in a processor, the processor to couple to the FIFO memory.

4. An apparatus, comprising:

a first storage unit to store one or more prior pop pointer values of a pop pointer;

a FIFO memory;

a push pointer;

a pre-pop request logic that is to store data into a memory array of the FIFO memory and to increment the push pointer prior to processing one or more pop requests;

a pop-request logic to process one or more pop requests to read data from the FIFO memory, to read a pop pointer value of the pop pointer and a push pointer value of the push pointer, to determine a status of the memory array in response to the pop pointer value, the push pointer value, a high threshold level, and a low threshold level, where the high threshold level is responsive to the lesser of a maximum branch resolution latency and the low threshold level;

a receive logic to receive information to indicate at least one of the one or more pop requests was speculative and to indicate that a state of the pop pointer of the FIFO memory should be restored; and a restore logic to restore one of the one or more prior pop pointer values to the pop pointer in response to the information.

5. The apparatus of claim 4, where, the maximum branch resolution latency is a depth of an instruction pipeline in a processor, the processor to couple to the FIFO memory.

6. The apparatus of claim 4, where, the information includes a branch resolution latency, the branch latency being the number of instruction cycles to resolve a conditional branch instruction in a processor, the processor to couple to the FIFO memory.

* * * * *